United States Patent
Tazai

[19]

[11] Patent Number: 5,882,275
[45] Date of Patent: Mar. 16, 1999

[54] COLUMN AUTOMATIC TRANSMISSION SHIFT LEVER DEVICE

[75] Inventor: Akira Tazai, Aichi-gun, Japan

[73] Assignee: Mannoh Kogyo Co., Ltd., Japan

[21] Appl. No.: 908,186

[22] Filed: Aug. 7, 1997

[30] Foreign Application Priority Data

Aug. 9, 1996 [JP] Japan .................................. 8-210896
Aug. 9, 1996 [JP] Japan .................................. 8-210897
Jul. 7, 1997 [JP] Japan .................................. 9-180875

[51] Int. Cl.⁶ .................................................. B60K 20/00
[52] U.S. Cl. ............................ 477/99; 192/4 A; 74/473.23
[58] Field of Search .............................. 477/99; 192/4 A; 74/473.31, 473.23

[56] References Cited

U.S. PATENT DOCUMENTS

| | | | |
|---|---|---|---|
| 4,821,605 | 4/1989 | Dzioba | 192/4 A |
| 4,934,209 | 6/1990 | Dewitt et al. | 74/473 |
| 4,936,431 | 6/1990 | Shinpo | 192/4 A |
| 5,027,931 | 7/1991 | Ratke et al. | 192/4 A |
| 5,050,411 | 9/1991 | Kawachi et al. | 70/248 |
| 5,065,641 | 11/1991 | Yamamoto et al. | 192/4 A |
| 5,588,514 | 12/1996 | Snell | 192/4 A |
| 5,647,465 | 7/1997 | Burkhard et al. | 192/4 A |
| 5,729,187 | 3/1998 | Moody et al. | 192/4 A |

FOREIGN PATENT DOCUMENTS

| | | |
|---|---|---|
| 2-38330 | 3/1990 | Japan . |
| 7-151224 | 6/1995 | Japan . |
| 5-86654 | 11/1997 | Japan . |

Primary Examiner—Dirk Wright
Attorney, Agent, or Firm—Parkhurst & Wendel

[57] ABSTRACT

In a column AT shift lever device, a base portion of a shift lever is fixed to a central portion of a shaft that is rotatably supported by a retainer. A select plate is pivotally connected to an end portion of the shaft. The select plate is capable of being moved by operation of a select cable, in a plane that includes a rotational axis of the shaft. A flat plate-like detent plate perpendicular to the rotational axis of the shaft is mounted outwardly of the retainer, and engaged with an end portion of the select plate.

16 Claims, 9 Drawing Sheets

COLUMN AUTOMATIC TRANSMISSION SHIFT LEVER DEVICE

BACKGROUND OF THE INVENTION

The present invention relates to an automotive column automatic transmission (AT) shift lever device and, more particularly, to a type of column AT shift lever device for performing a select operation using a select button provided in a shift knob.

A column AT shift lever device is a device wherein a shift lever is mounted near a column shaft. In a widely employed construction, at the time of a shift operation, for example, from the park position to a drive position, a select button provided in a shift knob is pressed so that the engagement between a detent plate and a detent member is released by operation of a select rod or a select cable, thereby permitting shift operations to proceed.

However, a conventional detent plate incorporated in a column AT shift lever device has a projection-recess detent pattern on its cylindrical surface that is coaxial with the rotating axis of the shift lever. Therefore, a detent plate is not easy to manufacture. In particular, if the device is reduced in size, the radius of the curvature of the cylindrical surface is similarly reduced and it becomes difficult to achieve high dimensional precision. The problem is that an error in the dimensional precision of the detent plate leads to error in the position of a shift cable assumed to correspond to each position of the shift lever.

SUMMARY OF THE INVENTION

Accordingly, it is an object of the present invention to provide a column AT shift lever wherein a detent plate does not lead to error in the position of the shift cable if the device is reduced in size.

According to one aspect of the present invention a column AT shift lever device comprises a shift lever assembly rotatably supported by a retainer, and a select plate pivotally connected to an end portion of the shift lever assembly. The select plate is movable in a plane that includes a rotating axis of the shift lever assembly. A generally flat plate-like detent plate is disposed in a location facing an end portion of the select plate. The detent plate is substantially perpendicular to the rotating axis of the shift lever assembly.

The shift lever assembly may have a shift lever and a hollow shaft fixed to a base portion of the shift lever, the hollow shaft being rotatably supported by the retainer.

The column AT shift lever device may also comprise a select plate capable of movement in a plane that includes a rotating axis of the shaft, and wherein the detent plate is substantially perpendicular to the rotating axis of the shaft.

The column AT shift lever device may also include a control lever that protrudes from the shaft, and a shift cable for an automatic transmission connected to an end of the control lever.

The select plate may be movable by operation of a select cable. Further, the select cable may extend through an interior of a shift lever and connect the select plate and a select button provided in a knob.

The column AT shift lever device may further have a construction wherein the select plate is movable by pressing the select button which in turn pulls the select cable, and wherein a main return spring is provided for returning the select plate to a previous position when the select button is released from depression.

According to another aspect of the present invention, which comprises a column AT shift lever device including a hollow shaft rotatably supported by a retainer, a shift lever is fixed at a base portion thereof to a substantially central portion of the shaft, and a select plate is pivotally connected to an end portion of the shaft. The select plate is movable by operation of a select cable in a plane that includes a rotating axis of the shaft. A generally flat plate-like detent plate is facing an end portion of the select plate that is located on the exterior of the retainer. The detent plate is substantially perpendicular to the rotating axis of the shaft.

The detent plate may have grooves in a projection-recess pattern.

The column AT shift lever device may further have a construction wherein an end of the select plate is engageable with the detent plate, and wherein a shift lock plate is provided on an outer surface of the retainer to restrict movement of the select plate in cooperation with at least one of braking operation and key operation.

According to still another aspect of the present invention, there is provided a shift lock mechanism of a column AT shift lever device, including a shaft rotatably supported by a retainer, a shift lever fixed at a base portion thereof to a substantially central portion of the shaft, and a select plate pivotally connected to a distal portion of the shaft. The select plate is capable of being moved by operation of a select cable in a plane that includes a rotating axis of the shaft. A generally flat plate-like detent plate is disposed in a location facing an end portion of the select plate that is located outwardly of the retainer. The detent plate is substantially perpendicular to the rotating axis of the shaft. Further, a slidable shift lock plate for restricting movement of the select plate in cooperation with braking operation and key operation is located on an outer surface of the retainer. The shift lock plate has an engagement hole engageable with a shift lock pin cooperable with a brake pedal so that if the column AT shift lever is in park position, and the brake pedal is not depressed, the shift lock pin is within the engagement hole thereby preventing the shift plate from sliding. The shift lock plate further has a protrusion engageable with a shift lock projection provided on a key cylinder so that when a key is turned to a predetermined LOCK position, the protrusion of the shift lock plate becomes engaged with the shift lock projection and also prevents the shift lock plate from sliding.

BRIEF DESCRIPTION OF THE DRAWINGS

The foregoing and further objects, features and advantages of the present invention will become apparent from the following description of a preferred embodiment with reference to the accompanying drawings, wherein like numerals are used to represent like elements and wherein.

DETAILED DESCRIPTION OF PREFERRED EMBODIMENT

A preferred embodiment of the present invention is described in detail hereinafter with reference to the accompanying drawings.

It should be understood that the drawings and accompanying description of the preferred embodiments of the present invention are described for a shift lever device for location on a steering wheel column-mounted shift device on the left side of the column, as typically would be done in right-side driven vehicles for use in Japan or the United Kingdom, for example. It will be understood that for such mechanisms for left-side driven vehicles, as typically used in the United States, for example, the parts of the inventive shift lever devices would be mirror images of the devices as shown and described herein.

Figure 3:
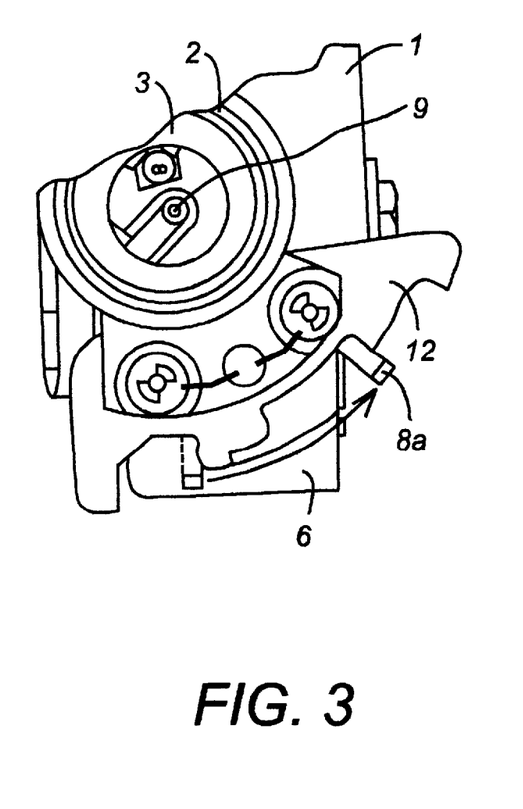
FIG. 3 is an enlarged sectional view of the column AT shift device taken on plane I—I of FIG. 1.
Figure 4:
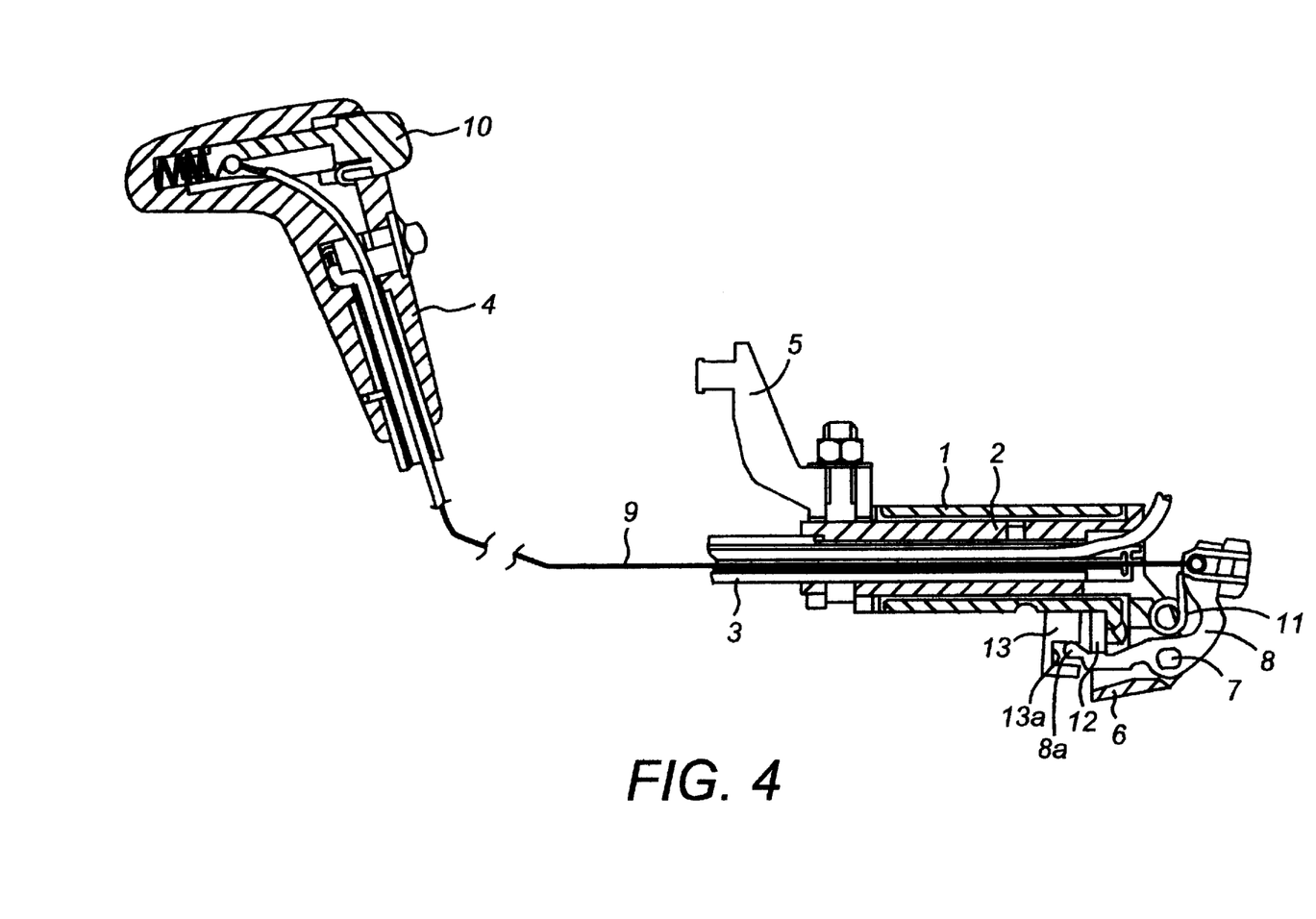
FIG. 4 is a central longitudinal sectional view of portions of the column AT shift device in a state where the select button is released.
Figure 5:
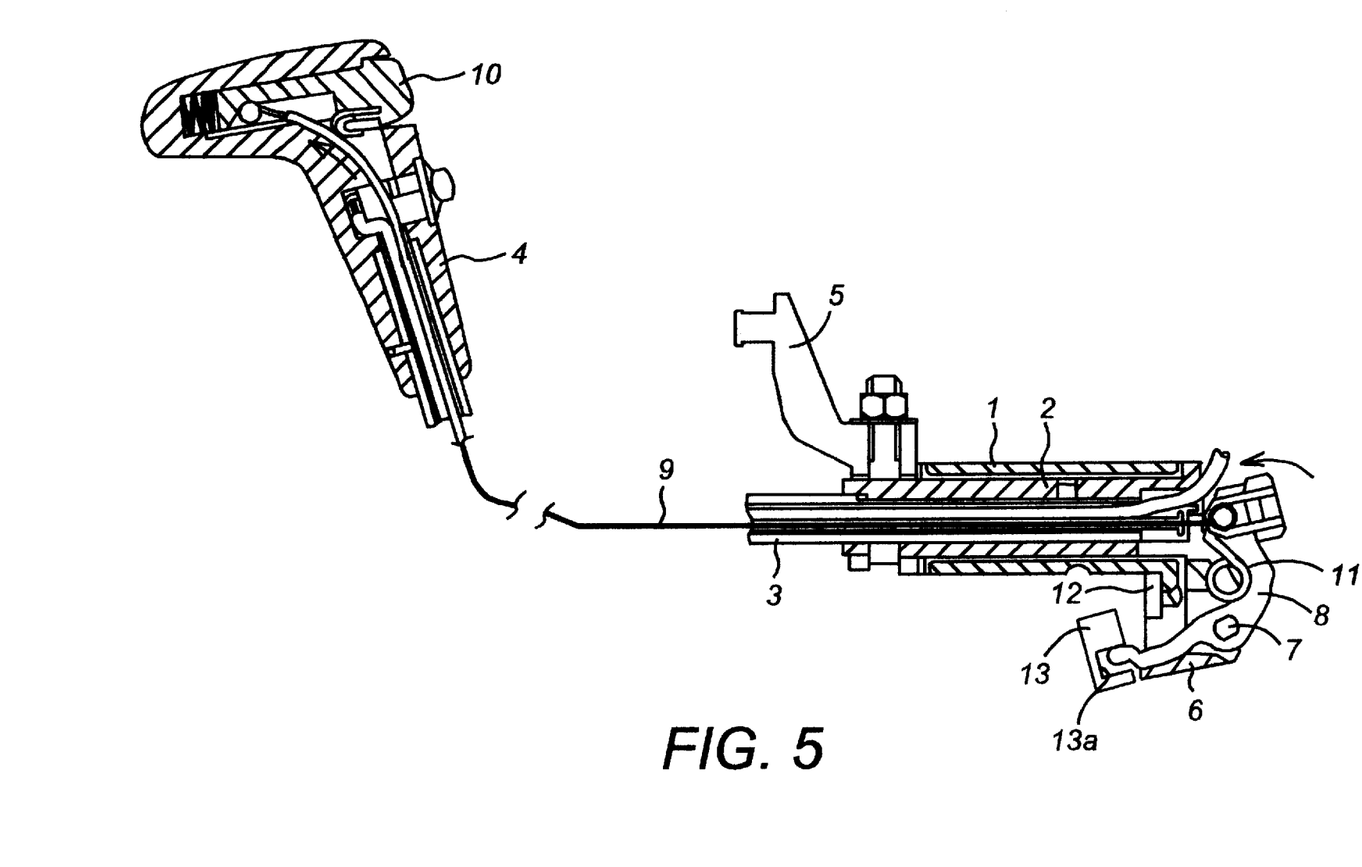
FIG. 5 is a central longitudinal sectional view of portions of the column AT shift device in a state where the select button is depressed.

Referring to FIGS. 1 through 5, a column AT shift lever device according to this embodiment has a retainer 1 for fixing the column AT shift lever device to a column shaft or the like, and a shaft 2 rotatably supported inside the retainer 1. A hollow shift lever 3 has a knob 4 provided on a distal end thereof. A base portion of the shift lever 3 has a non-circular sectional shape and is fixed to a substantially central portion of the shaft 2 so that the shift lever 3 cannot be rotated relative to the shaft 2, as indicated in FIGS. 4 and 5.

Figure 1:
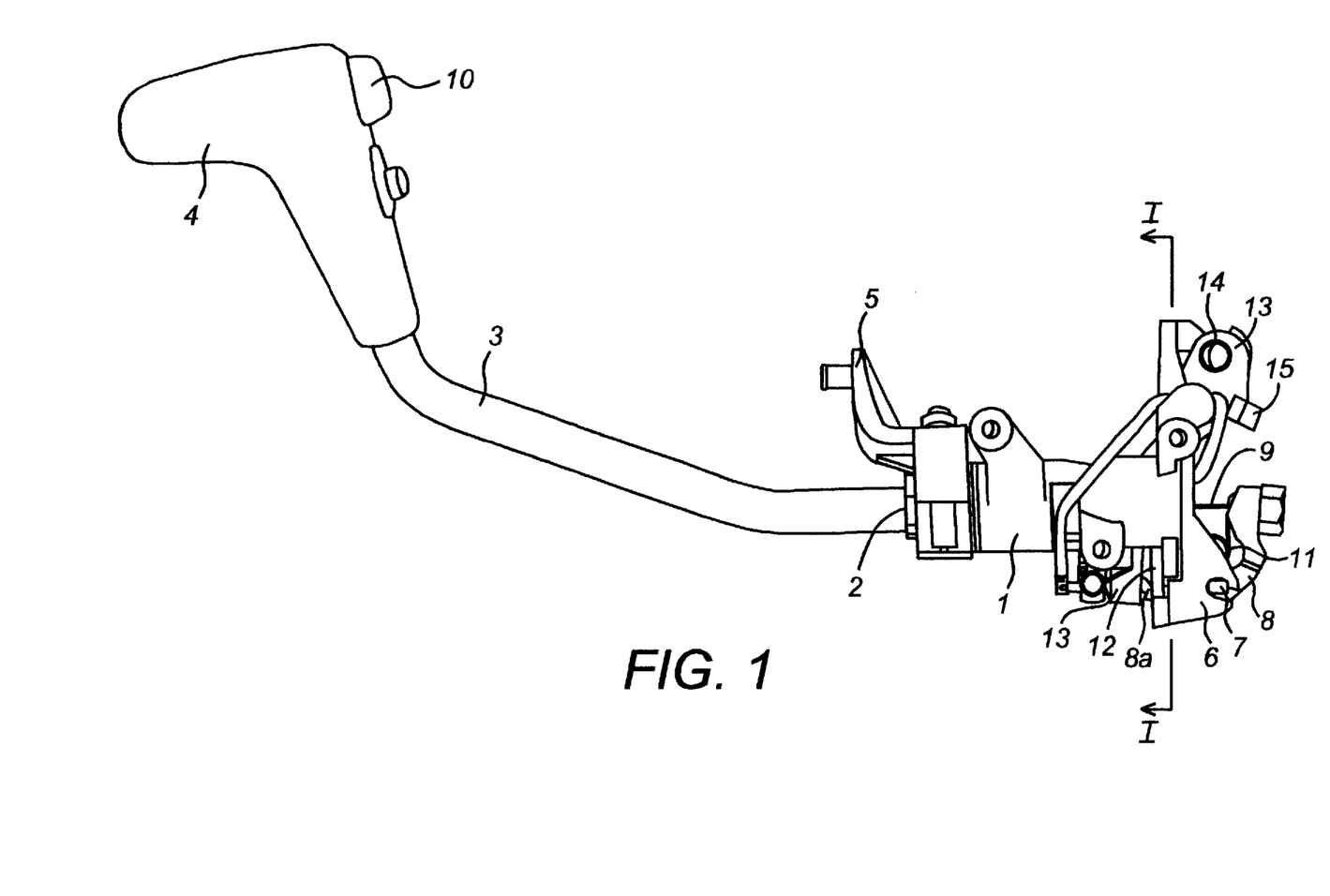
FIG. 1 shows a top view of an entire column AT shift lever device according to a preferred embodiment of the present invention.
Figure 2:
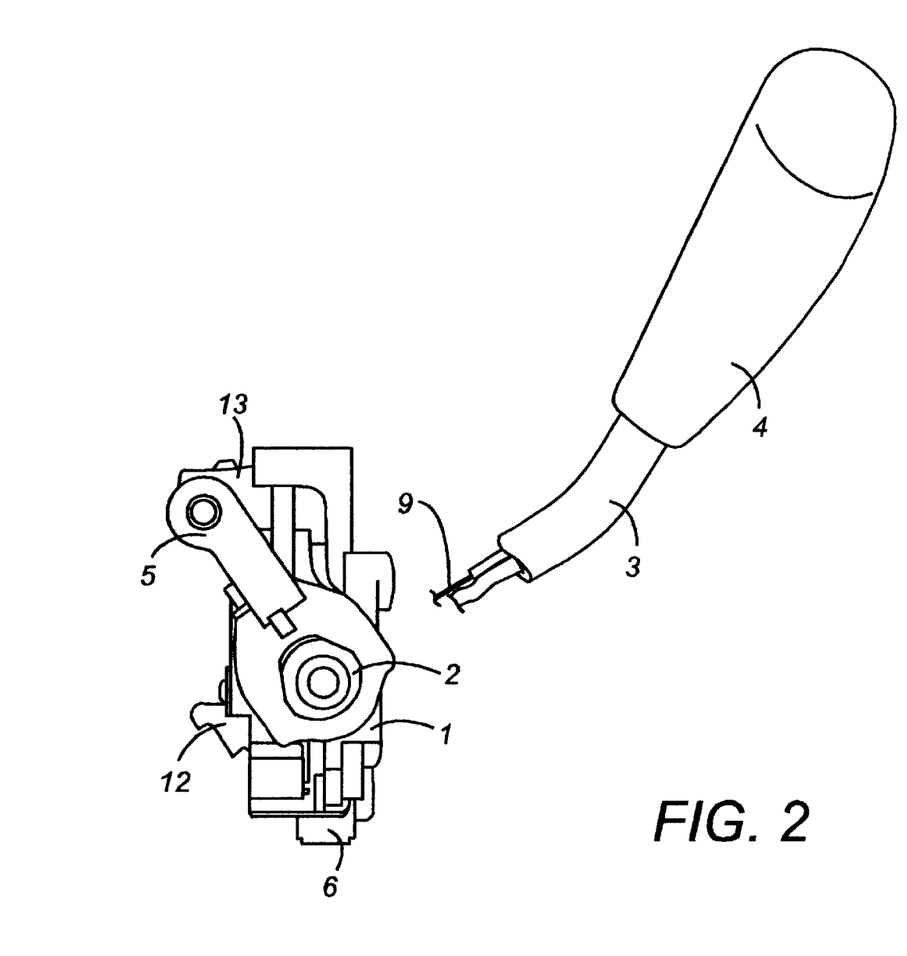
FIG. 2 is a left side view of the column AT shift device shown in FIG. 1.
Figure 6:
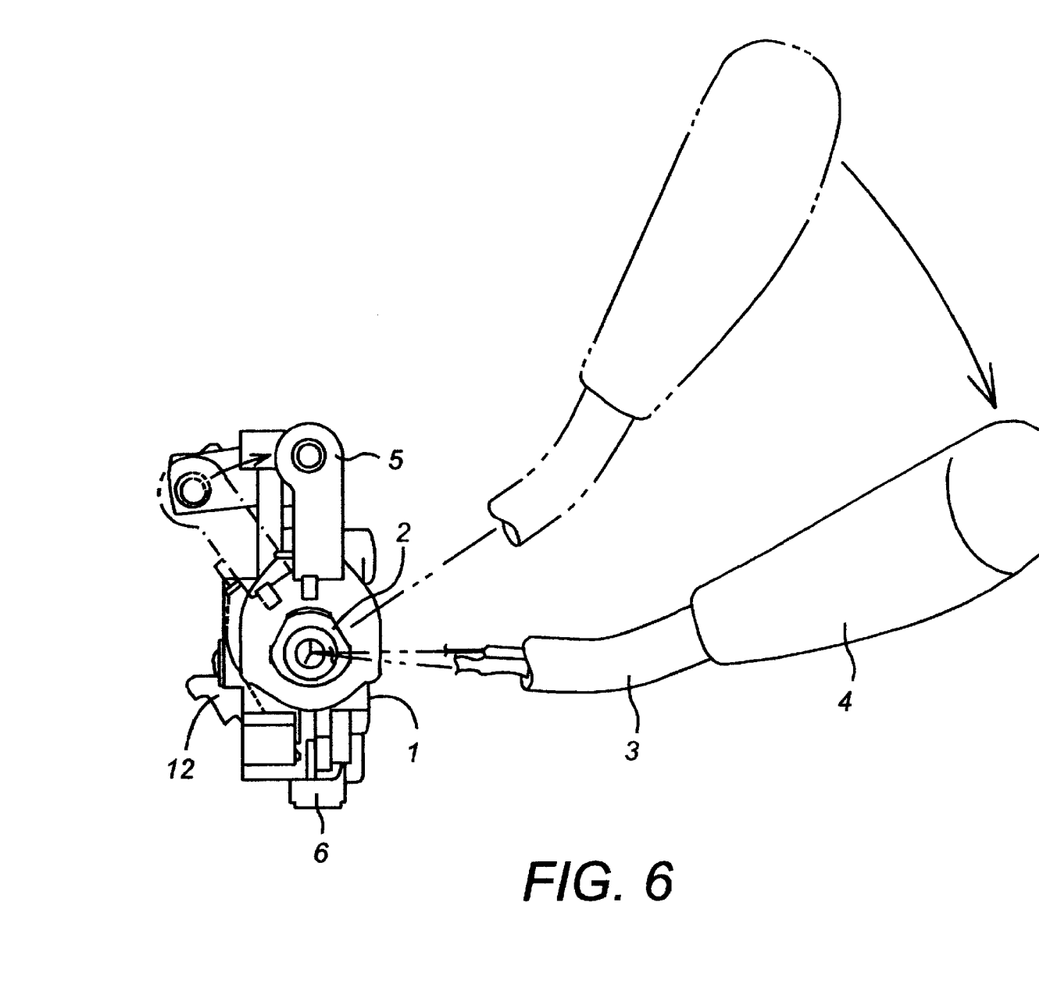
FIG. 6 is a side view of the column AT shift device illustrating the relationships between a shift lever and a control lever.

A control lever 5 is projected from an end portion of the hollow shaft 2, the end portion being located on a left side thereof in FIGS. 1, 4 and 5. A shift cable (not shown) is connected to a distal end of the control lever 5. Therefore, when the shift lever 3 is operated as indicated in FIG. 6, the shaft 2 turns inside the retainer 1 and, simultaneously, the control lever 5 swings, thereby operating an automatic transmission (not shown).

A right-side (in FIGS. 1, 4 and 5) end portion of the shaft 2 is firmly connected to or formed together with a flat plate-like portion 6 as shown in FIGS. 4 and 5. The flat plate-like portion 6 is projected in the direction of a radius of the hollow shaft 2. A select plate 8 is pivoted by a pivot shaft 7 provided in the flat plate-like portion 6. Fixed to an end portion of the select plate 8 is a select cable 9 extending through an interior of the shift lever 3. When a select button 10 of the knob 4 is pressed to pull the select cable 9, the select plate 8 swings in a plane that includes the rotating axis of the hollow shaft 2, as indicated in FIG. 5. A main return spring 11 returns the select cable 9 and the select plate 8 to a position indicated in FIG. 4 when the select button 10 is released from the depression.

Outside the retainer 1, a detent plate 12 substantially perpendicular to the rotating axis of the hollow shaft 2 is mounted facing an outer end portion of the select plate 8. The detent plate 12 has projection-recess grooves (a detent pattern) as shown in FIG. 3. An end portion 8a of the select plate 8 is always engaged with one of the grooves of the detent plate 12 by operation of the aforementioned main return spring 11.

In the thus-constructed column AT shift lever device, when the shift lever 3 is operated, the hollow shaft 2 turns inside the retainer 1, and the control lever 5 integrally fixed to the hollow shaft 2 also swings, thereby operating the automatic transmission, as described above. If it is desired to shift the shift lever 3, for example, from the park position to another position, the select button 10 of the knob 4 is depressed to pull the select cable 9. The select plate 8 then swings about the pivot shaft 7 in the plane that includes the rotating axis of the hollow shaft 2, so that the end portion 8a of the select plate 8 becomes released from a groove of the detent plate 12 as shown in FIG. 5. Thus it becomes possible to shift the shift lever 3 to another position.

As can be understood from the above description, since the device according to this embodiment of the present invention is constructed wherein the select plate 8 is caused to move in the plane that includes the rotating axis of the shaft 2 to engage with and disengage from the detent plate 12 substantially perpendicular to the rotating axis of the hollow shaft 2, the detent plate 12 can be provided in a simple shape formed by die-cutting a flat plate. Therefore, it becomes easy to produce an accurate shape compared with a conventional detent plate wherein a projection-recess detent pattern is formed on its cylindrical surface. This eliminates errors in the position of the shift cable corresponding to respective shift positions. Additionally, another advantage is that it becomes unnecessary to adjust the length of the shift cable after assembly.

A shift lock mechanism preferably incorporated into the column AT shift lever device according to the present invention is herein described. The shift lock mechanism operates when a key is turned from the LOCK position to the ACC position and the brake pedal is left undepressed, the shift lever 3 is not allowed to be moved from the park position to any other position, and if the shift lever 3 is not returned to the park position, the key is not free to be turned back to the LOCK position.

Figure 7:
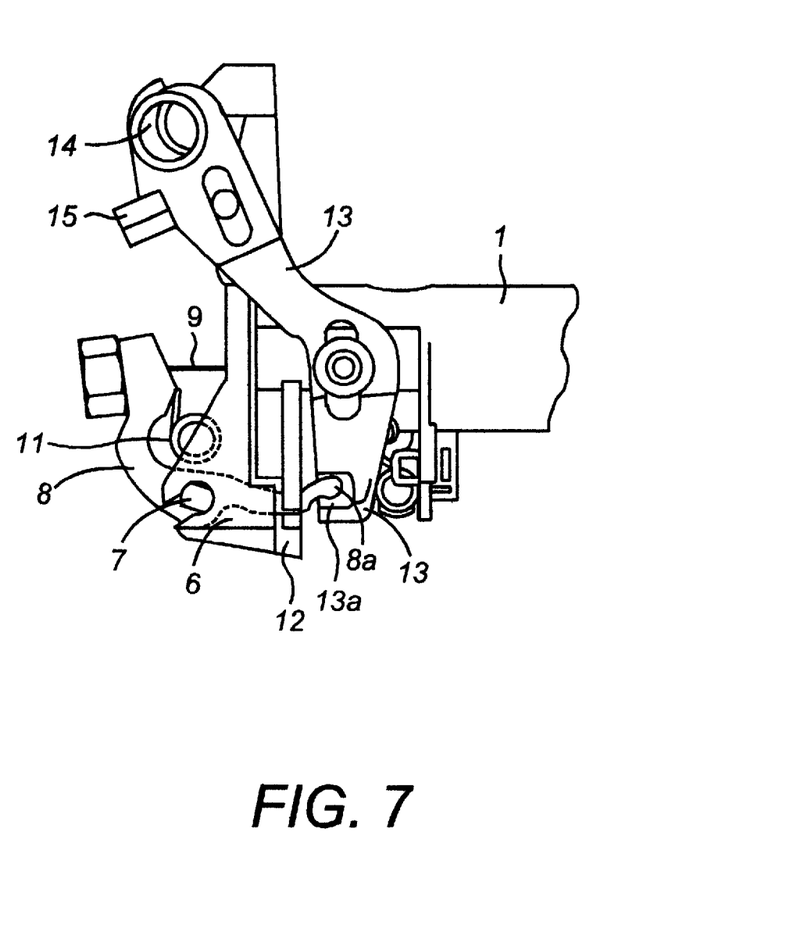
FIG. 7 is a rear view of portions of the column AT shift device shown in FIG. 1.

A shift lock mechanism is comprised of a shift lock plate 13 that is provided on a reverse surface of the retainer 1 as shown in FIG. 7. A lower end of the shift lock plate 13 extends to a position adjacent the detent plate 12, and the end portion 8a of the select plate 8 fits into a recess 13a of the shift lock plate 13. Since the shift lock plate 13 is slidable in a free state during driving, the swinging of the select plate 8 is not prevented.

Figure 8:
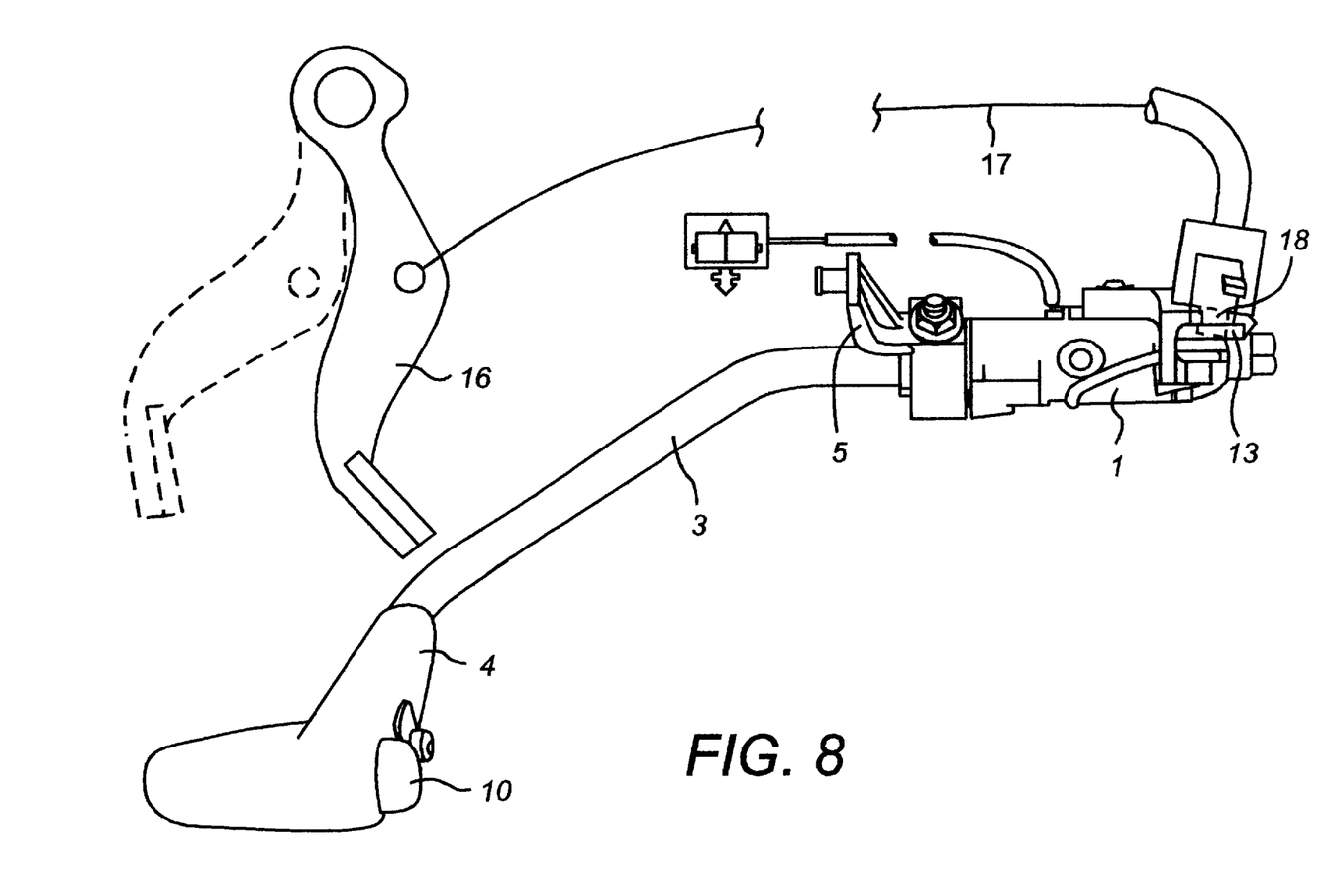
FIG. 8 illustrates the relationships between a brake pedal and a shift lock plate.

The shift lock plate 13 has, in an upper portion thereof, a pin insert hole 14 and a key engaging projection 15. As shown in FIG. 8, a shift lock pin 18 connected to an end of a shift lock cable 17 connected to a brake pedal 16 is inserted into the pin insert hole 14. In a parked state, the shift lock pin 18 is located in the pin insert hole 14 while the shift lock plate 13 is raised upward, thereby locking the shift lock plate 13. The shift lock plate 13 does not enjoy a free state unless the brake pedal 16 is depressed to pull the shift lock pin 18 out of the pin insert hole 14.

Figure 9:
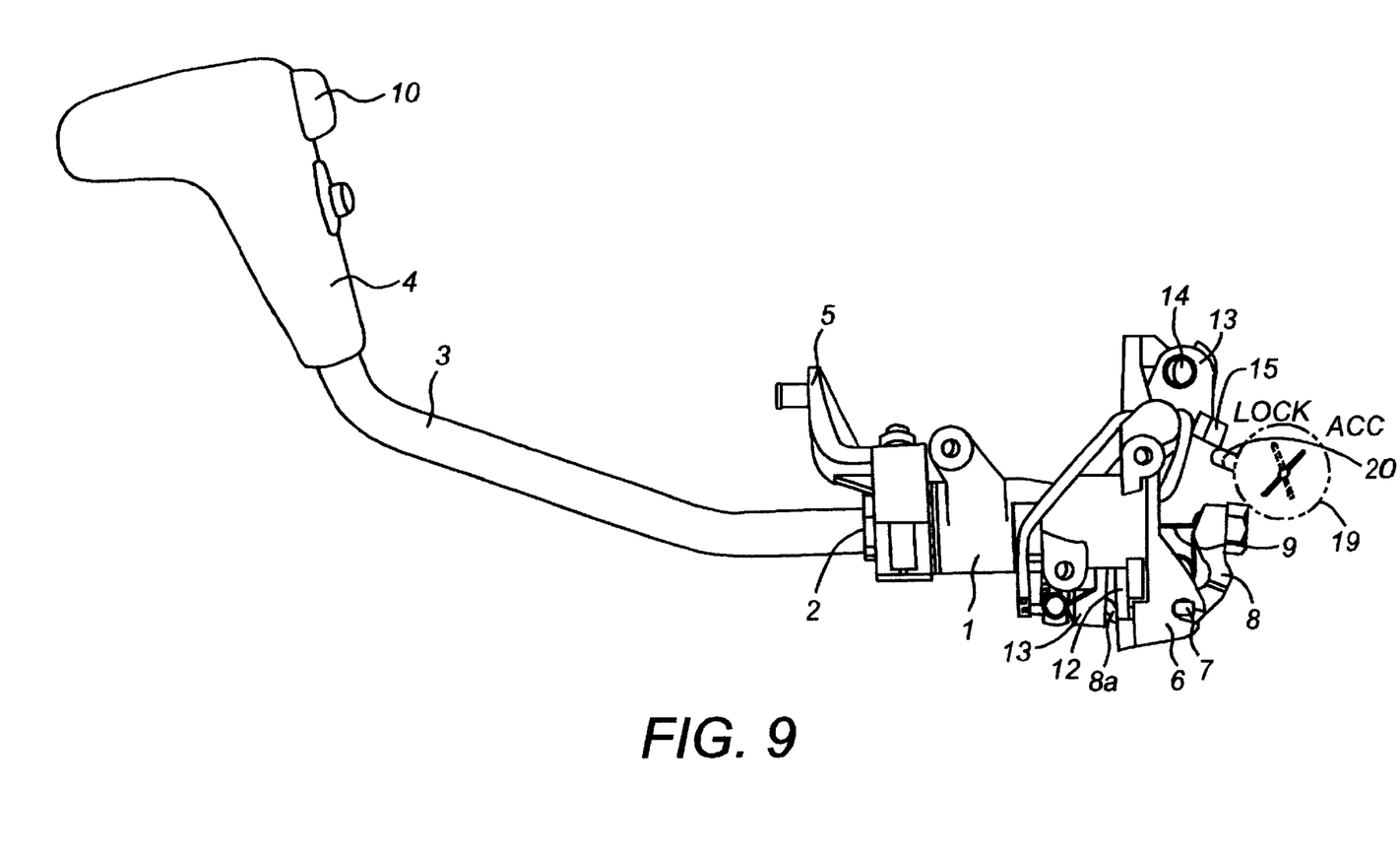
FIG. 9 illustrates the relationships between a key lock cylinder and the shift lock plate.

The key engaging projection 15 of the shift lock plate 13 engages with a lock pin 20 of a key lock cylinder 19 when the key is in the LOCK, as shown in FIG. 9, thereby locking the shift lock plate 13 while the shift lock plate 13 is raised upward. Therefore, the shift lock plate 13 does not enjoy a free state unless the key is turned to the ACC position.

In the thus-constructed shift lock mechanism, when the shift lever device is in the park position, the key engaging projection 15 of the shift lock plate 13 is engaged with the lock pin 20 of the key lock cylinder 19 and, at the same time, the shift lock pin 18 is inserted into the pin insert hole 14, thus achieving double locking of the shift lock plate 13. Therefore, even if depression of the select button 10 of the knob 4 is attempted to move the select plate 8, the select plate 8 cannot be moved since the shift lock plate 13, into which the end portion 8a of the select plate 8 is fitted, is locked. In this case, therefore, the shift lever 3 cannot be shifted from the park position to any other position.

For starting, the key is first turned to the ACC position to withdraw the lock pin 20 of the key lock cylinder 19, thereby releasing the lock pin 20 from the engagement with the key engaging projection 15 of the shift lock plate 13. When the brake pedal 21 is then depressed to pull the shift lock pin 18 from the pin insert hole 14, the shift lock plate 13 enters the free state. Therefore, it becomes possible to move the select plate 8 by depressing the select button 10 of the knob 4 and shift the shift lever 3 from the park position to a drive position or the like.

When the shift lever 3 is returned to the park position at the time of parking, the shift lock plate 13 is pushed up to the position indicated in FIG. 9 by the end portion 8a of the select plate 8. When the brake pedal 16 is subsequently released, the shift lock pin 18 is inserted into the pin insert hole 14, thus establishing a state where the key can be turned to the LOCK position. If the shift lever 3 is not returned to the park position, the key is prevented from being turned to the LOCK position since the lock pin 20 of the key lock cylinder 19 will hit and be stopped by the key engaging projection 15 of the shift lock plate 13, being in a position lower than the position indicated in FIG. 9.

As understood from the above description, the column AT shift lever device of the present invention is able to perform functions as in the conventional art, by using the flat plate-like plate, and makes it easier to manufacture a detent plate with high precision even if the device is reduced in size. Therefore, the errors in the position of the shift cable assumed to correspond to each shift position of the shift lever are accordingly eliminated, thereby achieving an advantage that length adjustment of the shift cable after assembly becomes unnecessary.

While the present invention has been described with reference to what is presently considered to be a preferred embodiment thereof, it is to be understood that the invention is not limited to the disclosed embodiment or constructions. To the contrary, the invention is intended to cover various modifications and equivalent arrangements included within the spirit and scope of the appended claims.

What is claimed is:

1. A column AT shift lever device, comprising:
   a shift lever assembly;
   a retainer, said retainer rotatably supporting said shift lever;
   a select plate pivotally connected to an end portion of the shift lever assembly, the select plate being movable in a plane that includes a rotational axis of the shift lever assembly; and
   a generally flat, plate-like detent plate facing a distal portion of the select plate, said plate-like detent being substantially perpendicular to the rotational axis of the shift lever assembly.

2. A column AT shift lever device according to claim 1, further comprising:
   a hollow shaft, the shaft being fixed to a base portion of the shift lever and rotatably supported by the retainer.

3. A column AT shift lever device according to claim 2, wherein the select plate is capable of movement in a plane that includes the rotational axis of the shaft, and wherein the detent plate is substantially perpendicular to the rotational axis of the shaft.

4. A column AT shift lever device according to claim 2, wherein a control lever extends upwardly from the hollow shaft, and a shift cable for an automatic transmission is connected to an end of the control lever.

5. A column AT shift lever device according to claim 1, wherein the select plate is movable by operation of a select cable.

6. A column AT shift lever device according to claim 5, wherein the select cable extends through an interior of a shift lever and connects the select plate and a select button provided in a knob.

7. A column AT shift lever device according to claim 6, wherein the select plate is movable by pressing the select button and thereby pulling the select cable, and wherein a main return spring is mounted for returning the select plate to a previous position when the select button is released from depression.

8. A column AT shift lever device comprising:
   a hollow shaft rotatably supported by a retainer;
   a shift lever fixed at a base portion thereof to a substantially central portion of the shaft;
   a select plate pivotally connected to an end portion of the shaft, the select plate being movable by operation of a select cable in a plane that includes the rotational axis of the shaft; and
   a generally flat, plate-like detent plate facing an end portion of the select plate that is located outwardly of the retainer, the detent plate being substantially perpendicular to the rotational axis of the shaft.

9. A column AT shift lever device according to claim 8, wherein the detent plate has grooves in a projection-recess pattern.

10. A column AT shift lever device according to claim 8, wherein an end of the select plate is engageable with the detent plate, and wherein a shift lock plate is provided on an outer surface of the retainer for restricting movement of the select plate in cooperation with at least one of braking operation and key operation.

11. A shift lock mechanism adapted to a column AT shift lever device as defined in claim 10, comprising:
    a shift lock pin cooperable with a brake pedal; and
    a slidable shift lock plate having an engagement hole formed near an end of the shift lock plate, the engagement hole being engageable with the shift lock pin so that when the brake pedal is not depressed while the column AT shift lever is in park position, the shift lock pin is engaged with the engaging hole and thereby prevents the shift lock plate from sliding.

12. A shift lock mechanism adapted to a column AT shift lever device as defined in claim 10, comprising:
    a shift lock projection on a key lock cylinder; and
    a slidable shift lock plate having a protrusion engageable with the shift lock projection so that when the key lock is turned to a predetermined LOCK position, the shift lock projection engages with the protrusion of the shift lock plate and thereby prevents the shift lock plate from sliding.

13. A shift lock mechanism according to claim 12, wherein the protrusion of the shift lock plate restricts movement of the shift lock projection of the key lock cylinder when the shift lever is not in a predetermined state when the key is about to be returned to the predetermined LOCK position, and thereby prevents the key from being returned to the predetermined LOCK position.

14. A shift lock mechanism of a column AT shift lever device, comprising:

a hollow shaft rotatably supported by a retainer;

a shift lever fixed at a base portion thereof to a substantially central portion of the shaft;

a select plate pivotally mounted to an end portion of the shaft, the select plate being capable of movement by operation of a select cable in a plane that includes a rotating axis of the shaft;

a generally flat, plate-like detent plate facing an end portion of the select plate that is located outwardly of the retainer, the detent plate being substantially perpendicular to the rotational axis of the shaft; and a slidable shift lock plate for restricting movement of the select plate in cooperation with braking operation and key operation, the shift lock plate being disposed on an outer surface of the retainer, the shift lock plate having:
an engagement hole engageable with a shift lock pin cooperable with a brake pedal so that when the brake pedal is not depressed while the column AT shift lever device is in the park position, the shift lock pin is engaged with the engagement hole and thereby prevents the shift lock plate from sliding; and a protrusion engageable with a shift lock projection provided on a key lock cylinder so that when a key is turned to a predetermined LOCK position, the protrusion of the shift lock plate becomes engaged with the shift lock projection and thereby prevents the shift lock plate from sliding.

15. A shift lock mechanism of a column AT shift lever device, according to claim 14, wherein the shift lock plate is free to slide when the brake pedal is depressed while the column AT shift lever device is in the park position and the key is turned to a position other than the predetermined LOCK position.

16. A shift lock mechanism of a column AT shift lever device, according to claim 15, wherein the protrusion of the shift lock plate restricts movement of the shift lock projection of the key lock cylinder when a shift lever is not in a predetermined state when the key is about to be returned to the predetermined LOCK position, and thereby prevents the key from being returned to the predetermined LOCK position.

* * * * *